United States Patent
Field et al.

(10) Patent No.: US 8,892,315 B2
(45) Date of Patent: Nov. 18, 2014

(54) METHOD OF CONTROLLING A CONTINUOUSLY VARIABLE TRANSMISSION

(75) Inventors: Matthew Gibson Field, Lancashire (GB); Stephen William Murray, Grimsargh (GB); Matthew Piers Burke, Lancashire (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 0 days.

(21) Appl. No.: 13/348,509

(22) Filed: Jan. 11, 2012

(65) Prior Publication Data

US 2012/0220425 A1 Aug. 30, 2012

Related U.S. Application Data

(62) Division of application No. 10/550,905, filed as application No. PCT/EP2004/003293 on Mar. 29, 2004, now Pat. No. 8,108,108.

(30) Foreign Application Priority Data

Mar. 27, 2003 (GB) .................................. 0307038.0
Nov. 11, 2003 (GB) .................................. 0326206.0

(51) Int. Cl.
*G06F 7/00* (2006.01)
(52) U.S. Cl.
USPC .................. 701/51; 701/69; 701/82; 701/90; 477/110; 477/43; 477/50; 477/68; 477/78; 180/65.21; 180/65.225
(58) Field of Classification Search
CPC .............................. B60W 10/11; B60W 10/06
USPC .............. 701/69, 82; 477/110, 43, 50, 68, 78
See application file for complete search history.

(56) References Cited

U.S. PATENT DOCUMENTS 4,107,776 A * 8/1978 Beale .............................. 701/99
4,680,959 A 7/1987 Henry et al.
(Continued)

FOREIGN PATENT DOCUMENTS

EP 0 444 086 B1 1/1993
EP 0 444086 B1 1/1993
(Continued)

OTHER PUBLICATIONS

PCT International Search Report and Written Opinion for PCTIEP2004/003293, 10 pgs. (Jun. 30, 2004).

(Continued)

*Primary Examiner* — Redhwan K Mawari
(74) *Attorney, Agent, or Firm* — Blakely, Sokoloff, Taylor & Zafman LLP

(57) ABSTRACT

A method for controlling a continuously variable ratio transmission is described. The method may include controlling a continuously variable ratio unit ("variator") having rotary input and output members through which the variator is coupled between an engine and a driven component, the variator receiving a primary control signal and being constructed and arranged to exert upon its input and output members torques which correspond directly to the control signal. The method may also include determining a target engine acceleration, determining settings of the variator's primary control signal and of an engine torque control for providing the required engine acceleration and adjusting the control signal and/or the engine torque control based on these settings, predicting a consequent engine speed change, allowing for engine and/or transmission characteristics, and correcting the settings of the control signal and engine torque based on a comparison of actual and predicted engine speeds.

11 Claims, 13 Drawing Sheets

(56) References Cited

U.S. PATENT DOCUMENTS

| | | | |
|---|---|---|---|
| 4,922,424 A | 5/1990 | Hiramatsu | |
| 4,956,972 A * | 9/1990 | Sasajima et al. | 60/327 |
| 5,083,473 A | 1/1992 | Nakano | |
| 5,275,474 A * | 1/1994 | Chin et al. | 303/148 |
| 5,395,292 A | 3/1995 | Fellows et al. | |
| 5,423,727 A | 6/1995 | Fellows | |
| 5,521,819 A * | 5/1996 | Greenwood | 701/60 |
| 5,577,474 A * | 11/1996 | Livshiz et al. | 123/352 |
| 5,766,105 A | 6/1998 | Fellows et al. | |
| 5,797,110 A * | 8/1998 | Braun et al. | 701/84 |
| 5,976,054 A | 11/1999 | Yasuoka | |
| 6,087,734 A * | 7/2000 | Maeda et al. | 290/40 C |
| 6,349,700 B1 * | 2/2002 | Buckland et al. | 123/352 |
| 6,385,970 B1 | 5/2002 | Kuras et al. | |
| 6,418,366 B1 | 7/2002 | Danz et al. | |
| 6,497,636 B2 | 12/2002 | Schleicher et al. | |
| 6,564,138 B1 * | 5/2003 | Schmitt et al. | 701/82 |
| 6,654,678 B1 * | 11/2003 | Rodriguez | 701/104 |
| 8,108,108 B2 | 1/2012 | Field et al. | |
| 2001/0010029 A1 | 7/2001 | Hattori et al. | |
| 2002/0055817 A1 | 5/2002 | Chou | |
| 2003/0017911 A1 | 1/2003 | Lack | |
| 2004/0074473 A1 * | 4/2004 | Okubo et al. | 123/339.23 |
| 2005/0236894 A1 * | 10/2005 | Lu et al. | 303/139 |
| 2008/0027614 A1 * | 1/2008 | Field et al. | 701/60 |
| 2008/0120003 A1 * | 5/2008 | Nihei | 701/69 |
| 2012/0220425 A1 * | 8/2012 | Field et al. | 477/110 |

FOREIGN PATENT DOCUMENTS

| | | | | |
|---|---|---|---|---|
| EP | 0 736 153 B1 | | 3/1998 | |
| EP | 0 736153 B1 | | 3/1998 | |
| EP | 0 788 914 A3 | | 5/1998 | |
| EP | 0 925 992 A2 | | 6/1999 | |
| EP | 0 933 284 A2 | | 8/1999 | |
| EP | 0 925 992 A2 | | 4/2001 | |
| EP | 0 925 992 A3 | | 4/2001 | |
| EP | 1 177 933 A3 | | 4/2002 | |
| EP | 1 231 397 A2 | | 8/2002 | |
| EP | 1 251 026 A3 | | 5/2003 | |
| JP | 63-266259 | | 11/1988 | |
| JP | 04-365661 | | 12/1992 | |
| JP | 04365661 A | * | 12/1992 | B60T 8/58 |
| JP | 06-159489 | | 6/1994 | |
| JP | 06-159489 A | | 6/1994 | |
| JP | 09-024810 | | 1/1997 | |
| JP | 09024810 A | * | 1/1997 | B60T 8/24 |
| JP | 2000-313250 | | 11/2000 | |
| JP | 2000-313250 A | | 11/2000 | |
| JP | 2001-115867 | | 4/2001 | |
| JP | 2001-115867 A | | 4/2001 | |
| WO | WO 90/05860 A1 | | 5/1990 | |
| WO | WO 95/17621 A1 | | 6/1995 | |

OTHER PUBLICATIONS

GB Search Report for GB 0307038.0, 2 pgs. (Mar. 30, 2004).
Ironside, et al., "Microcomputer Control of an Automotive Perbury Transmission", IMechE, paper No. C200/51, 1981, pp. 283-292.
Stubbs, "The Development of a Perbury Traction Transmission for Motor Car Applications", ASME (The American Society of Mechanical Engineers), paper No. 80-GT-22, Mar. 1980, pp. 1-12.
PCT Notification of Transmittal of International Preliminary Examination Report for PCT Application No. PCT/EP2004/003293, 6 pgs. (Nov. 19, 2004).
Patents Act 1977: Examination Report under Section 17(5) for United Kingdom Counterpart Application No. GB 0326206.0, 3 pgs. (Apr. 6, 2004).

* cited by examiner

METHOD OF CONTROLLING A CONTINUOUSLY VARIABLE TRANSMISSION

CROSS-REFERENCE TO RELATED APPLICATION

The present patent application is a divisional application of U.S. patent application Ser. No. 10/550,905, filed Jan. 31, 2007, now U.S. Pat. No. 8,108,108, issued Jan. 31, 2012, entitled "METHOD OF CONTROLLING A CONTINUOUSLY VARIABLE TRANSMISSION," which is a U.S. National Phase Application under 35. U.S.C. §371 of International Application No. PCT/EP2004/003293, filed on Mar. 29, 2004, which claims priority from Great Britain Patent Application No. 0307038.0, filed on Mar. 27, 2003, and Great Britain Patent Application No. 0326206.3, filed Nov. 11, 2003.

FIELD

The present invention is concerned with the control of a transmission of continuously variable ratio type and of an associated engine The term "engine" as used herein should be understood to encompass any suitable device for providing rotational drive including internal combustion engines and electric motors. The present invention has been developed in connection with transmissions for motor vehicles and is particularly well suited to this application. Nonetheless it is considered potentially applicable to transmissions for use in other contexts.

BACKGROUND

In any continuously variable transmission there is a device, referred to herein as a "variator", which provides a continuously variable drive ratio. The variator couples to other parts of the transmission—typically gearing leading on one side of the variator to the engine and on the other side to driven components such as the driven wheels of a motor vehicle—through rotary input and output members. The speed of the output member divided by the speed of the input member is the "variator drive ratio".

The concept of "torque control" is known in this art but will now be explained. It is useful to distinguish from the alternative of "ratio control".

A ratio-controlled variator receives a control signal representing a required variator drive ratio. The variator responds by adjusting its drive ratio to the required value. The adjustment typically involves detecting the position of a ratio-determining element of the variator (e.g. the separation of the sheaves in a belt-and-sheave variator, or the position of the rollers in a toroidal-race type variator) and adjusting the actual position of this element to a desired position (determined by the control signal) using a feedback loop. Thus in a ratio controlled variator, ratio corresponds directly to the control signal.

This is not the case in a torque-controlled variator. Instead a torque-controlled variator is constructed and arranged such as to exert upon its input and output members torques which, for a given variator drive ratio, correspond directly to the variator's primary control signal. It is torque which is the control variable rather than drive ratio. Changes in speed of the variator input and output, and hence changes in variator drive ratio, result from the application of these torques, added to externally applied torques (e.g. from engine and wheels), to the inertias coupled to the variator input and output. The variator drive ratio is permitted to change correspondingly.

Torque control has to date principally been applied to toroidal-race, rolling-traction type variators. In an arrangement described for example in Torotrak (Development) Ltd's European patent EP444086, variator rollers serve to transmit drive between co-axially mounted input and output discs. The variator rollers exert respective torques $T_{in}$ and $T_{out}$ upon the input and output discs. Correspondingly the rollers experience a "reaction torque" $T_{in}+T_{out}$ about the disc axis. This reaction torque is opposed by an equal and opposite torque applied to the rollers about the axis by a set of actuators. The geometry is such that movement of the rollers about the disc axis is accompanied by "precession" of tie rollers—a change in the angles of the roller axes to the disc axis, effecting a corresponding change in variator drive ratio. By controlling the actuator torque, the reaction torque $T_{in}+T_{out}$ is directly controlled. The control signal in this type of variator corresponds directly to the reaction torque.

The actual torques exerted by the variator upon its input and output depend not only on the control signal but also upon the current drive ratio, since although the sum $T_{in}+T_{out}$ is uniquely determined by the control signal, the magnitude of the ratio $T_{in}/T_{out}$ is equal to the reciprocal of the variator drive ratio, and so subject to change with the variator drive ratio. Nonetheless it can be appreciated that, for a given drive ratio, both $T_{in}$ and $T_{out}$ are uniquely determined by the control signal.

The direct correspondence between reaction torque and control signal is not provided by all torque-controlled variators. An example of a torque-controlled variator of a quite different type, using belt-and-sheave construction, is provided in the applicant's own prior European patent 736153 and its U.S. Pat. No. 5,766,105, wherein one sheave is mounted upon its drive shaft in such a way that motion of the sheave relative to the shaft along a helical path is permitted. Hence when torque is applied to the sheave, a corresponding force along the axis of the shaft is created. This axial force is opposed by a force applied to tie sheave by an actuator. Again, an equilibrium is created between the two forces. It can again be said of this example that the torque $T_{in}$ exerted by the sheaves upon the shaft is, for a given variator drive ratio, uniquely determined by the control signal, which corresponds to the force applied by the actuator.

A feature common to both arrangements is that the variator comprises a component—the movable sheave or variator roller—whose position corresponds to the current variator drive ratio and that this component is subject to a biasing torque (or force) which is determined by the control signal and is balanced by the torques created at the variator input/output.

Effective utilization of torque-controlled transmissions depends on electronics to regulate the engine and transmission in unison. Early papers on the electronic control of such a powertrain are by Stubbs—"The Development of a Perbury Traction Transmission for Motor Car Applications", ASME (The American Society of Mechanical Engineers) paper no. 80-GT-22, March 1980 and also by Ironside and Stubbs—"Microcomputer Control of an Automotive Perbury Transmission", IMechE paper no. C200/81, 1981. Both papers describe a project concerned with electronic control of a transmission based on a toroidal-race rolling-fraction type variator operating in torque controlled mode.

Both papers point out an important advantage associated with continuously variable transmissions: that fuel economy can be greatly enhanced when using such transmissions by operating the engine at or close to the levels of engine speed and engine torque at which it is most fuel efficient. For any given level of engine power demanded by the driver there is a particular combination of engine speed and engine torque which provides best fuel efficiency. Stubbs plotted the locus of such "optimal efficiency" points on a graph forming a line representing the optimal engine efficiency. The control strategies proposed by Ironside and Stubbs were based on operating the engine on this line where possible.

In the control schemes described in these papers the driver's demand was interpreted as a requirement for wheel torque, which was then converted into a requirement for engine power by multiplication by the rotational speed of the vehicle wheels. From this power a unique point on the optimal efficiency line was selected, providing target values for the engine torque and engine speed. The engine was set to produce the target torque and the loading applied to the engine by the variator adjusted to bring the engine speed to the target value, using a closed loop based on engine speed.

Stubbs' simple approach proves inadequate, for a production motor vehicle, in a number of ways relating to stability of the transmission ratio and to driveability of the vehicle.

The challenges involved in controlling a torque-controlled transmission are very different from those involved in controlling a ratio-controlled transmission. In the latter, since the variator maintains a chosen drive ratio, torque at the driven wheels is related directly to engine torque. Engine speed control is a relatively straightforward matter since, by maintaining a set drive ratio, the transmission provides a direct relationship between engine speed and vehicle speed. In a torque-controlled transmission, in which drive ratio is not the control variable and is permitted to vary, the engine and wheels can be thought of as being effectively de-coupled from one another. Wheel torque is controlled by the variator rather than by engine torque. Engine speed is not constrained to follow vehicle speed. Instead the control signal applied to the variator determines a loading torque applied by the variator to the engine. Combustion within the engine creates an engine torque. The sum of the loading torque and the engine torque acts upon the inertia referred to the engine (contributed by masses in both engine and the transmission) and so determines engine acceleration. While the loading torque and the engine torque are equal and opposite, engine speed is constant. Changes in engine speed result from an inequality between these torques. Dynamic matching of engine torque to loading torque is thus fundamental to management of the drive line as a whole and of engine speed in particular. Failure to manage the balance would allow unwanted changes in engine speed.

Some issues relating to engine speed management are addressed in U.S. Pat. No. 6,497,636 (Schleicher et al) which, so far as the present applicant has been able to understand the language of this document, concerns itself with transmission and engine adjustments needed to bring the engine to the desired operating point (engine speed and engine torque).

The profile of changes in engine speed is important to the "driveability" of the vehicle. The fact that in a CVT power train the engine is typically run at low speed and high torque (to provide high fuel economy) makes the management of engine speed especially important. When the driver calls for an increase in power the engine, already operating close to its maximum torque, must typically be accelerated in a controlled manner in order to be capable of providing the required power.

SUMMARY

An object of the present invention is to make possible effective control of a drive line utilizing a torque-controlled transmission.

In accordance with a first aspect of the present invention there is a method of controlling a continuously variable ratio transmission of the type comprising a continuously variable ratio unit ("variator") which has rotary input and output members through which the variator is coupled between an engine and a driven component, the variator receiving a primary control signal and being constructed and arranged such as to exert upon its input and output members torques which, for a given variator drive ratio, correspond directly to the control signal, the method comprising:

determining a target engine acceleration, determining settings of the variator's primary control signal and of an engine torque control for providing the required engine acceleration and adjusting the control signal and/or the engine torque control based on these settings, predicting a consequent engine speed change, and correcting the settings of the control signal and engine torque based on a comparison of actual and predicted engine speeds.

In accordance with a second aspect of the present invention there is a method of controlling a continuously variable ratio transmission of the type comprising a continuously variable ratio unit ("variator") which has rotary input and output members through which the variator is coupled between an engine and a driven component, the variator receiving a primary control signal and being constructed and arranged such as to exert upon its input and output members torques which, for a given variator drive ratio, correspond directly to the control signal, the method comprising:

determining a target engine acceleration, determining an excess torque TrqAcc required to accelerate power train inertia to achieve the target engine acceleration, and adjusting the control signal to the variator and/or adjusting a torque controller of the engine such that engine torque is equal to loading torque applied by the transmission to the engine plus the excess torque TrqAcc.

In accordance with a third aspect of the present invention, there is a method of controlling engine speed error in a motor vehicle powertrain comprising an engine which drives at least one vehicle wheel through a transmission which provides a continuously variable ratio, the transmission being constructed and arranged to exert upon the engine a chosen loading torque and to permit the transmission ratio to vary in accordance with changes in engine speed, so that engine acceleration results from applications of a net torque, which is the sum of the loading torque and engine torque created by the engine, to the inertias referred to the engine, the method comprising, in a feedback loop, the steps of determining the engine speed error, supplying the engine speed error to a closed loop controller which establishes a control effort, which is a correction to the net torque required to reduce the engine speed error, establishing, taking account of the control effort, an allocation of the control effort between (i) adjustment of the engine torque and (ii) adjustment of the loading torque, and effecting the adjustment.

BRIEF DESCRIPTION OF THE DRAWINGS

Specific embodiments of the present invention will now be described, by way of example only, with reference to the accompanying drawings in which.

DETAILED DESCRIPTION

Figure 1:
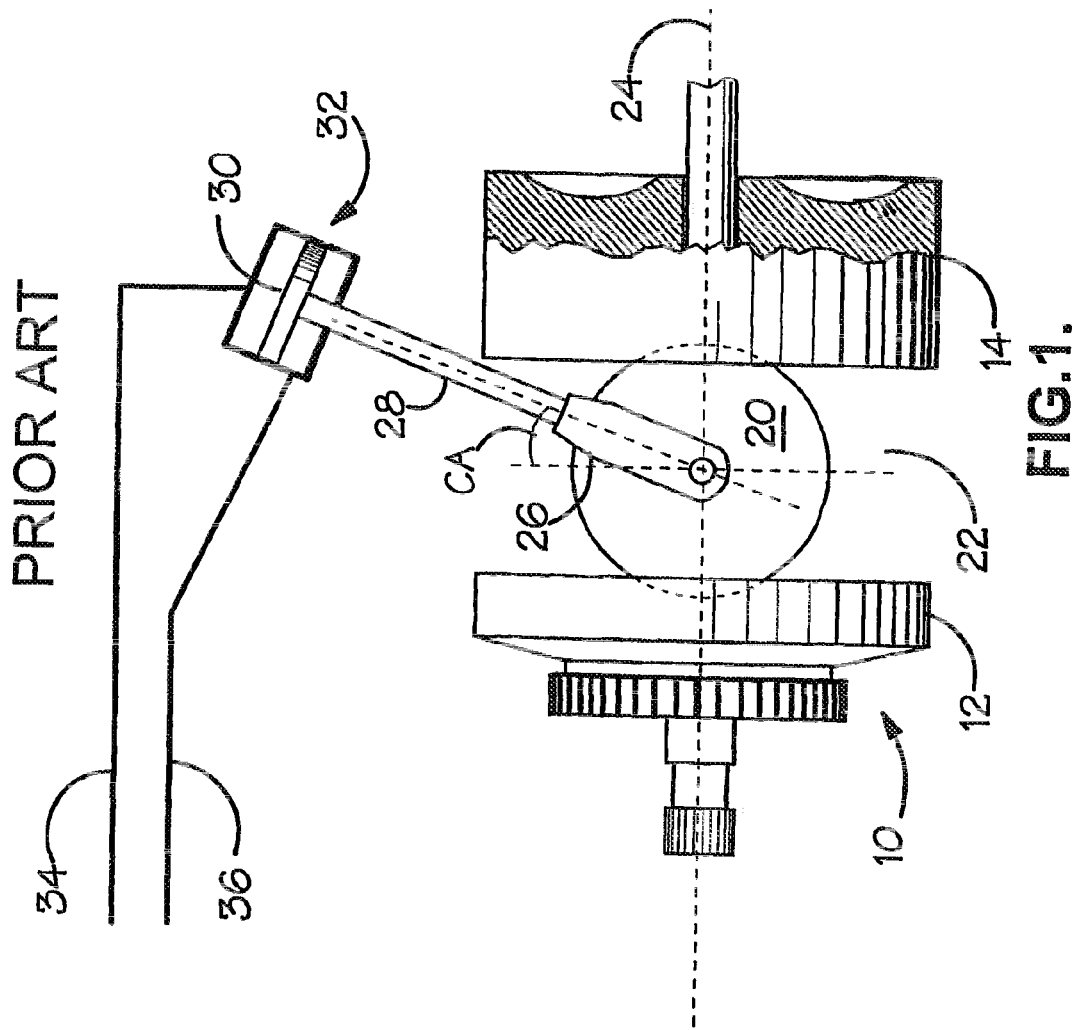
FIG. 1 is a simplified illustration of a toroidal-race, rolling-traction variator, of a type known in itself, suitable for use in implementing the present invention.
Figure 2:
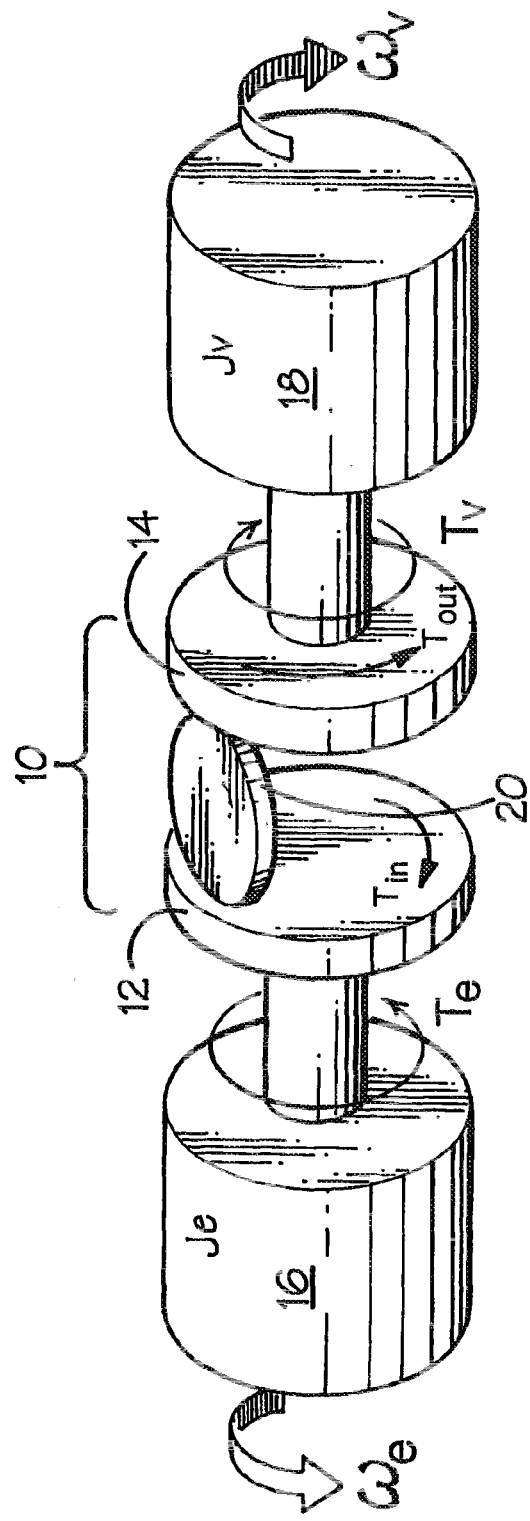
FIG. 2 is a highly schematic representation of a powertrain of torque-controlled type suitable for implementing the present invention.

The present invention has been developed in connection with a vehicle transmission using a torque-controlled variator of toroidal-race, rolling-traction type. The invention is considered potentially applicable to other types of torque-controlled transmission. Nonetheless the toroidal-race variator in question will now be very briefly described, in order to illustrate certain relevant principles. More detail on both the construction and function of this type of variator is to be found in various patents and published applications held by Torotrak (Development) Ltd. including FIG. 1 illustrates some of the major components of the variator 10 and FIG. 2 illustrates, in highly schematic format, major parts of a drive line incorporating the variator. In FIG. 1 the variator is seen to comprise co-axially mounted input and output discs 12, 14 together defining a toroidal cavity 22 containing a variator roller 20. The roller runs on respective faces of the input and output discs in order to transmit drive from one to the other. The roller is mounted in a manner permitting it to move along a circumferential direction about the axis 24 of the discs 12, 14. The roller is also able to "precess". That is, the roller's axis is able to rotate, changing the inclination of the roller to the disc axis. In the illustrated example the roller is mounted in a carriage 26 coupled by a stem 28 to a piston 30 of an actuator 32, A line from the center of the piston 30 to the center of the roller 20 constitutes a "precession axis" about which the whole assembly can rotate. Changes in the inclination of the roller result in changes in the radii of the paths traced on the input and output discs 12, 14 by the roller. Consequently a change in roller inclination is accompanied by a change in variator drive ratio.

Note that the precession axis does not lie precisely in a plane perpendicular to the disc axis, but is instead angled to this plane. This angle, labeled CA in FIG. 1, is referred to herein as the "castor angle". As the roller moves back and forth it follows a circular path centered on the disc axis. Furthermore, the action of the discs 12, 14 upon the rollers tends to maintain the milers at such an inclination that the roller axis intersects the disc axis. This intersection of the axes can be maintained, despite movement of the roller along its circular path, by virtue of the castor angle. The result is that translational movement of the roller about the disc axis is accompanied by precession of the roller and so by a change in variator drive ratio. If one neglects slip between the roller and the discs, the position of the variator roller corresponds to the variator drive ratio and so to the speed ratio between the engine and the driven wheels.

The actuator 32 receives opposed hydraulic fluid pressures through lines 34, 36 and force applied to the roller by the actuator corresponds to the difference in pressures in the lines. This pressure difference is the primary control signal applied to the variator, in this example. The effect of this force is to urge the roller to move along its circular path about the disc axis. Equivalently one can say that the actuator exerts a torque about the disc axis upon the roller. The actuator torque is balanced by torque created by the interaction of the roller with the discs. The roller exerts a torque $T_{in}$ upon the input disc 12 and a torque $T_{out}$ upon the output disc 14. Correspondingly the discs together exert a torque $T_{in}+T_{out}$ upon the roller, about the disc axis. The quantity $T_{in}+T_{out}$ (the reaction torque) is equal to the actuator torque and so directly proportional to the control signal formed by the aforementioned pressure difference. Hence this control signal determines the reaction torque created by the variator.

FIG. 2 is intended to illustrate certain principles relating to control of the powertrain. An engine is represented by box 16 and is coupled to the input disc 12 of the variator. A direct coupling is shown in this highly simplified drawing. In practice there is of course intervening gearing. Masses coupled to the variator's input disc, including the mass of the engine itself, provide an engine-side inertia $J_e$. Masses represented by a box 18 and acting upon the variator output disc 14 provide a vehicle-side inertia $J_v$. While traction is maintained between the vehicle's driven wheels and the road, the mass of the vehicle itself contributes to the effective output inertia $J_v$.

The variator's control signal determines, at the current variator drive ratio, the torque $T_{in}$ applied to the variator input disc 12 by the roller. The simplified arrangement illustrated in FIG. 2 with the variator input disc 12 directly coupled to the engine would result in the loading torque applied to the engine being equal to the torque $T_{in}$ applied to the variator input disc 12 and for the sake of simplicity the two will be taken to be equal in the present discussion. Due to the gearing interposed between the input disc 12 and the engine 16 in a practical transmission, the loading torque experienced by the engine is equal to the variator input torque $T_{in}$ divided by the ratio of the intervening gearing (neglecting frictional losses).

While the engine is driving the vehicle, the loading torque $T_{in}$ is opposed by the engine torque $T_e$ which is the torque created by combustion in the engine. Note that this is not necessarily the same as the torque available at the engine's drive shaft since some of the engine torque $T_e$ goes to overcoming the engine-side inertia while engine speed is changing. The sum of the engine torque $T_e$ and the loading torque $T_{in}$ acts upon the engine-side inertia $J_e$ (which includes the engine inertia) so that an inequality between loading torque $T_{in}$ and engine torque $T_e$ causes a change in engine speed $\omega_e$. The variator automatically accommodates the resultant change in transmission ratio. Likewise the control signal determines the variator output torque $T_{out}$. This is divided by the ratio of gears interposed between the variator and the vehicle wheels, and added to externally applied torques $T_v$ (e.g. from the vehicle wheels) in determining the net torque available to accelerate the output-side inertia $J_v$. Again, frictional losses in gearing are neglected in this discussion for the sake of simplicity. In this way changes in transmission output speed $\omega_e$ are produced and again resultant ratio change is automatically accommodated by the variator.

The illustrated variator 10 is of course greatly simplified for the sake of clarity. For instance a practical variator typically has two pairs of input/output discs defining two toroidal cavities each of which contains a set of rollers. In such an arrangement the reaction torque is the sum of the torques applied to all of the variator rollers. The principles of operation set out above are however essentially unchanged in a practical transmission.

It should be clear from the aforegoing that in order to control engine speed it is necessary to control the dynamic balance between the torque created within the engine (the "engine torque") and the loading torque applied to the engine by the transmission (the "loading torque"). This must be done while at the same time providing the driver with torque at the driven wheels of the vehicle ("wheel torque") which, to within some acceptable tolerance, matches the driver's demand as communicated through the accelerator control. The dynamic balance can be adjusted by the powertrain's control system through adjustments to:

i. The engine torque (via the engine controls-fuel supply etc.) As a means of controlling engine speed this has the advantage: that changes in engine torque do not (in a torque controlled transmission) directly produce a change in wheel torque. However adjustments carried out with the engine's throttle are relatively slow. That is, there is an appreciable lag between an adjustment to the throttle and the corresponding change in the torque actually provided by the engine. This is due to factors including the dynamics of the engine's intake manifold. Adjustments to engine torque also compromise fuel economy.

ii. The variator reaction torque, which determines the loading torque applied to the engine. This has the advantage of being relatively fast. However changes in reaction torque lead to changes in wheel torque, with the attendant problem that if reaction torque adjustments are used to control engine speed then the driver may not experience the wheel torque requested through the accelerator control. The problem is highly significant at low ratio when a large change in wheel torque is needed to effect a small change in engine loading torque.

A co-ordinated strategy for controlling reaction torque and engine torque is required.

Figure 3:
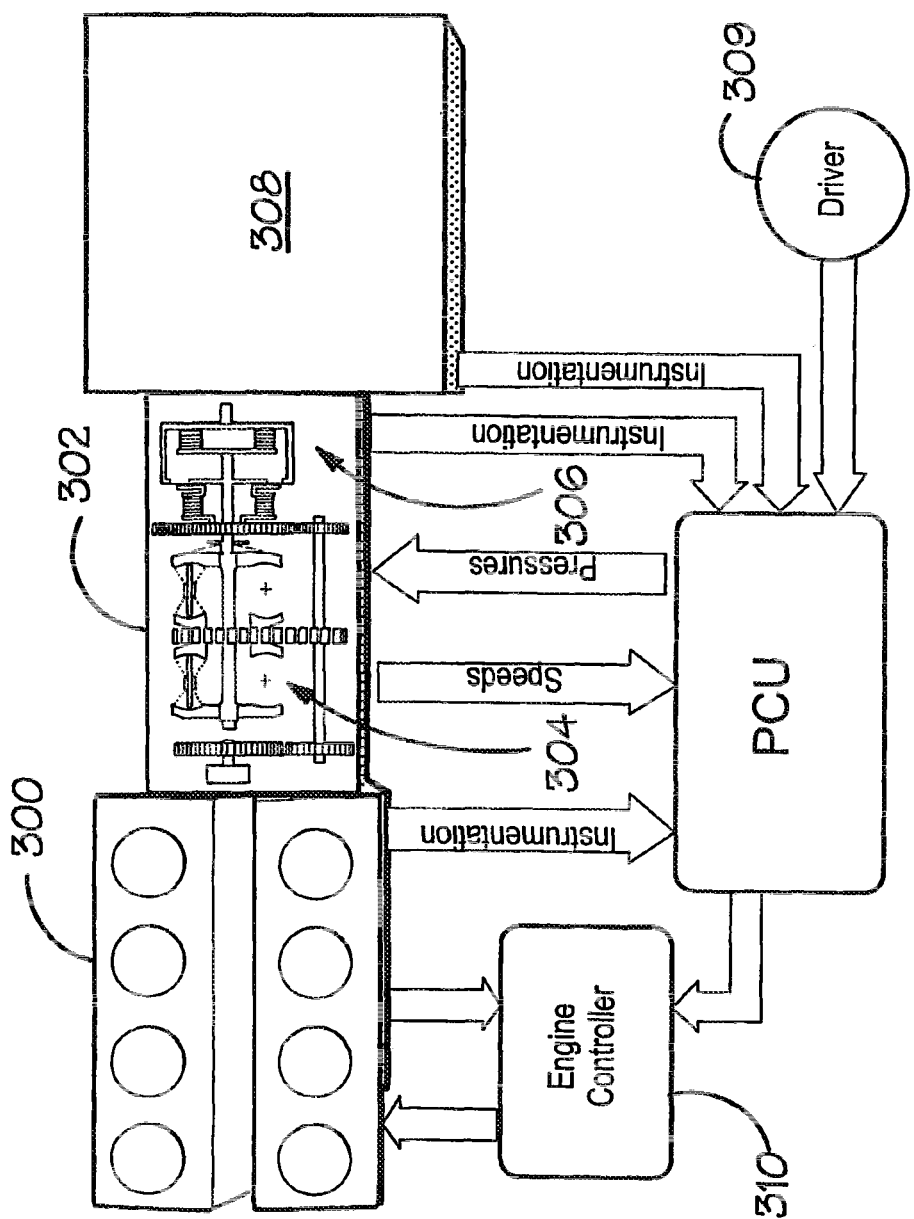
FIG. 3 is a schematic representation of the hardware used in powertrain control.

A broad overview of the main components of a control system embodying the present invention is provided in FIG. 3 wherein the engine is seen at 300 and drives a continuously variable, torque-controlled type transmission 302. The diagram schematically indicates both the variator 304 and epicyclic gearing 306 through which the variator is coupled between transmission input and output in either of a low regime, in which the range of ratios available from the variator maps onto a low range of overall transmission ratios, and a high regime, in which the range of variator ratios maps onto a higher range of overall transmission ratios. The transmission output is coupled to a load—typically the driven wheels of a motor vehicle—which is represented by block 308 in the drawing.

The control of both engine and transmission is performed electronically, subject to direction from the driver. Conventional digital microprocessors are programmed for this task in current embodiments. The illustrated architecture serves as an example only and may be further simplified in production versions, but comprises an electronic Powertrain Control Unit ("PCU") which receives data from instrumentation associated with the engine; the transmission and also from the driver's control 309 (formed e.g. by the accelerator pedal of a conventional motor vehicle). In response the PCU provides outputs controlling the behaviour of both engine and transmission. Engine control is carried out through an electronic engine controller 310. Transmission control is effected in this exemplary embodiment by control of hydraulic pressures applied to the variator 304 and, in order to control transmission regime, to clutches of its associated gearing 306.

Figure 4A:
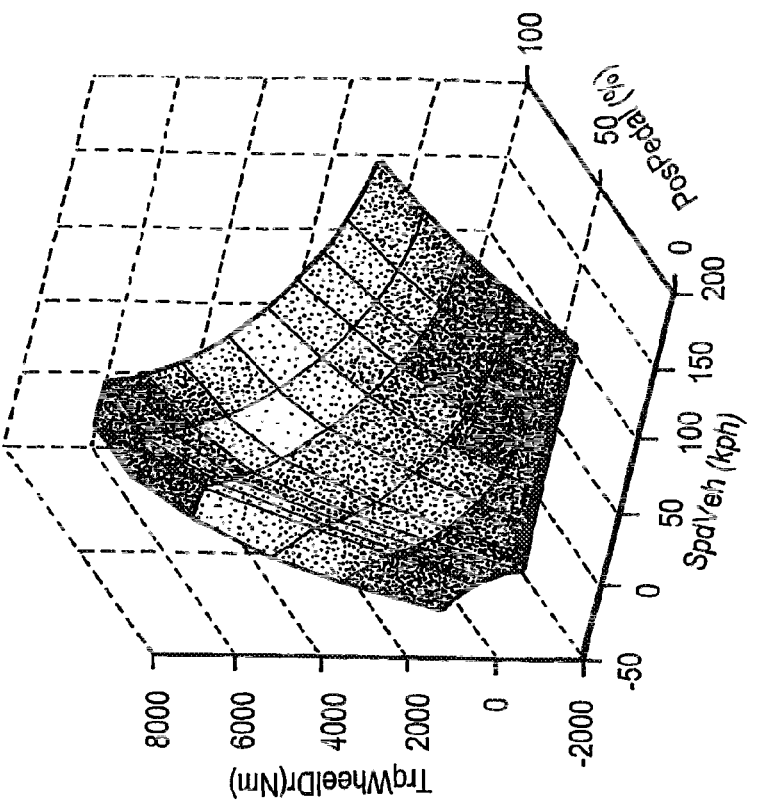
FIGS. 4a and 4b are graphs representing the interpretation of a driver's control input in a control system embodying the present invention.
Figure 4B:
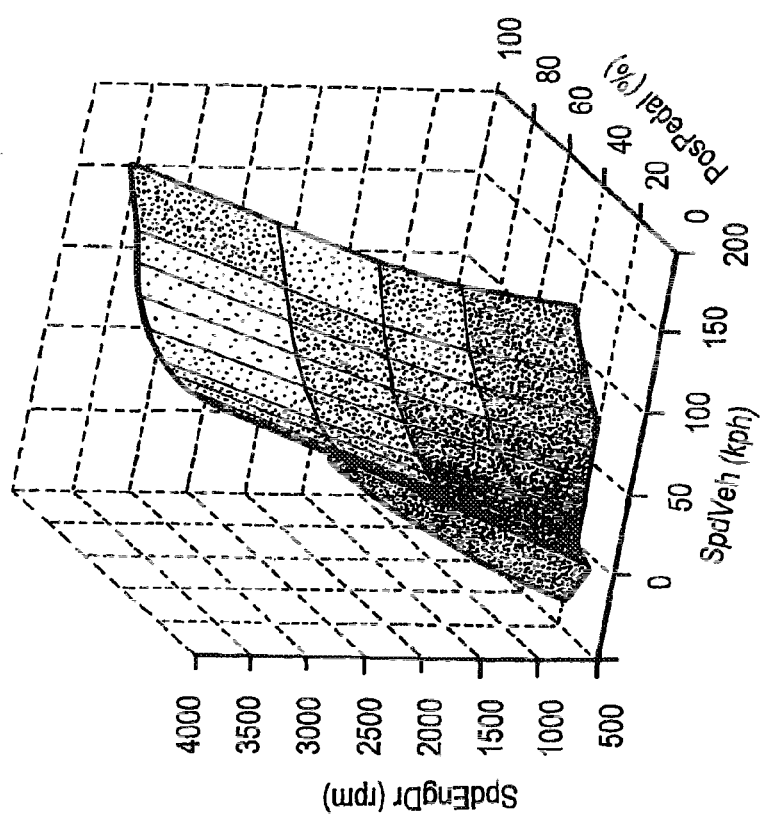

In controlling a motor vehicle power train it is necessary firstly to interpret the driver's input, which is of course typically communicated through the position of an accelerator control such as a pedal. What the current control system does is to map pedal position onto a driver demand for wheel torque and engine speed, taking account of vehicle speed. FIG. 4*a* is a graph showing the engine speed requested by the driver (SpdEngDr) against the vehicle speed (SpdVeh) and the pedal positions (PosPedal). FIG. 4*b* shows the driver's requested wheel torque (TrqWheelDr) once more against vehicle speed and pedal position. The two graphs are recorded in Ile form of look up tables in the control system.

Figure 5:
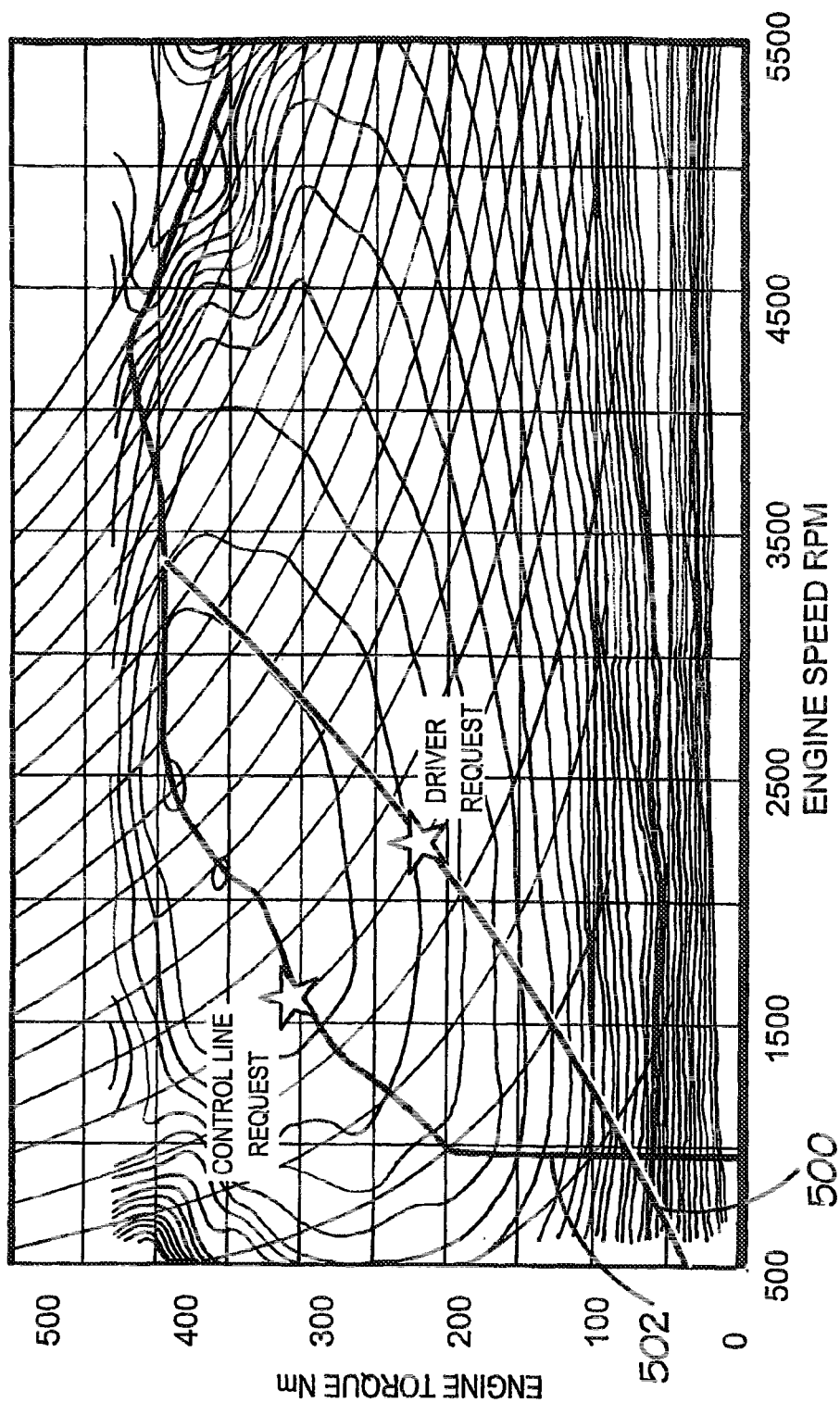
FIG. 5 is an example of a map of engine torque against engine speed for an internal combustion ermine.

Based on the driver's requested wheel torque—TrqWheelDr—a mathematical model of the transmission (taking account of factors including transmission efficiency) is used to obtain the driver's requested engine torque which, in conjunction with the driver's requested engine speed, enables the driver's requested engine power to be determined. The driver's requested engine torque and engine speed may be used unmodified or alternatively the driver's requested engine power may be used in conjunction with an engine map, or set of engine maps, to determine the optimal engine speed and engine torque for providing the requested engine power. Purely by way of example, to illustrate how optimization with regard to engine efficiency can be achieved, FIG. 5 is an engine map with engine speeds along the horizontal axis and engine torque on the vertical axis. Line 500 shows how the driver's requested engine speed and torque vary as the pedal position is changed. Line 502 represents the relationship between engine speed and engine torque which provides optimal engine efficiency. Asterisks on the two lines correspond to the same level of engine power, and the system can choose between the two operating points.

The process of interpretation of driver demand results in a base target engine torque, TrgEngBaseReq and a base target engine speed SpdEngBaseReq.

The task of the system under consideration is to control the engine and transmission in such a manner as to achieve, or in a dynamic situation at least to adjust toward, these values while providing torque at the driven vehicle wheels which reflects the driver's demand. The control process will be described in detail below but can be summarised as comprising the following steps, which are repeated in a loop.

1. Determine the difference between actual and base target engine speeds.

2. Calculate from this difference a target engine acceleration—i.e. the rate at which the engine should be accelerated toward the base target engine speed (a controlled engine speed profile is desired) and then calculate the torque which will be taken up in overcoming inertia in order to provide the target engine acceleration (based on the moment of inertia $J_e$ referred to the engine.

3. Set the engine torque controller appropriately to provide the engine torque required both to (1) create an appropriate wheel torque and (2) accelerate the engine, overcoming the inertia $J_e$. Where possible the wheel torque corresponds to the driver request. However, the available engine torque being finite, it is necessary in some situations to accept a lower wheel torque in order to provide the torque required to accelerate the engine.

4. Calculate what instantaneous torque the engine will actually provide given this engine torque controller setting, since the engine's reaction to its controller is not instantaneous. Factors including the engine's intake manifold dynamics create a lag between adjustment and resultant changes in engine torque. Techniques for modeling the instantaneous output torque are known in the art and are applied here.

5. Adjust the control signal applied to the variator to load the engine with a torque equal to the calculated instantaneous engine torque, derived from the aforesaid model, minus the torque required to accelerate the engine, calculated at step 2. The signal may also be adjusted by a latching strategy, to be explained below.

6. Calculate what engine acceleration is actually expected. This expected value does not precisely match the target acceleration, since the calculation of the expected value takes account of (a) the instantaneous engine torque calculated above and (b) a further model representing the transmission's response to the control applied at step 5 above, the transmission too having a time lag in its response to the control input. The calculation is also based on the moment of inertia $J_e$ of the engine and transmission referred to the engine.

7. Integrate the engine acceleration obtained at step 6 to obtain a predicted engine speed, and then apply a closed loop correction of the actual engine speed, correcting it toward the predicted value.

Steps 1 to 6 can be referred to as a "feed forward" strategy. Step 7 is a "feedback" strategy used to correct for deviations from the predicted engine speed. Because the closed loop feedback engine speed correction is used only to adjust the engine speed toward an expected value based on models of the engine and transmission dynamics, the amount of such correction is minimized. The process allows the engine acceleration to be controlled and "profiled" (the rate of engine acceleration being a controlled function of the discrepancy between actual and target engine speeds) in a highly effective manner.

Figure 6:
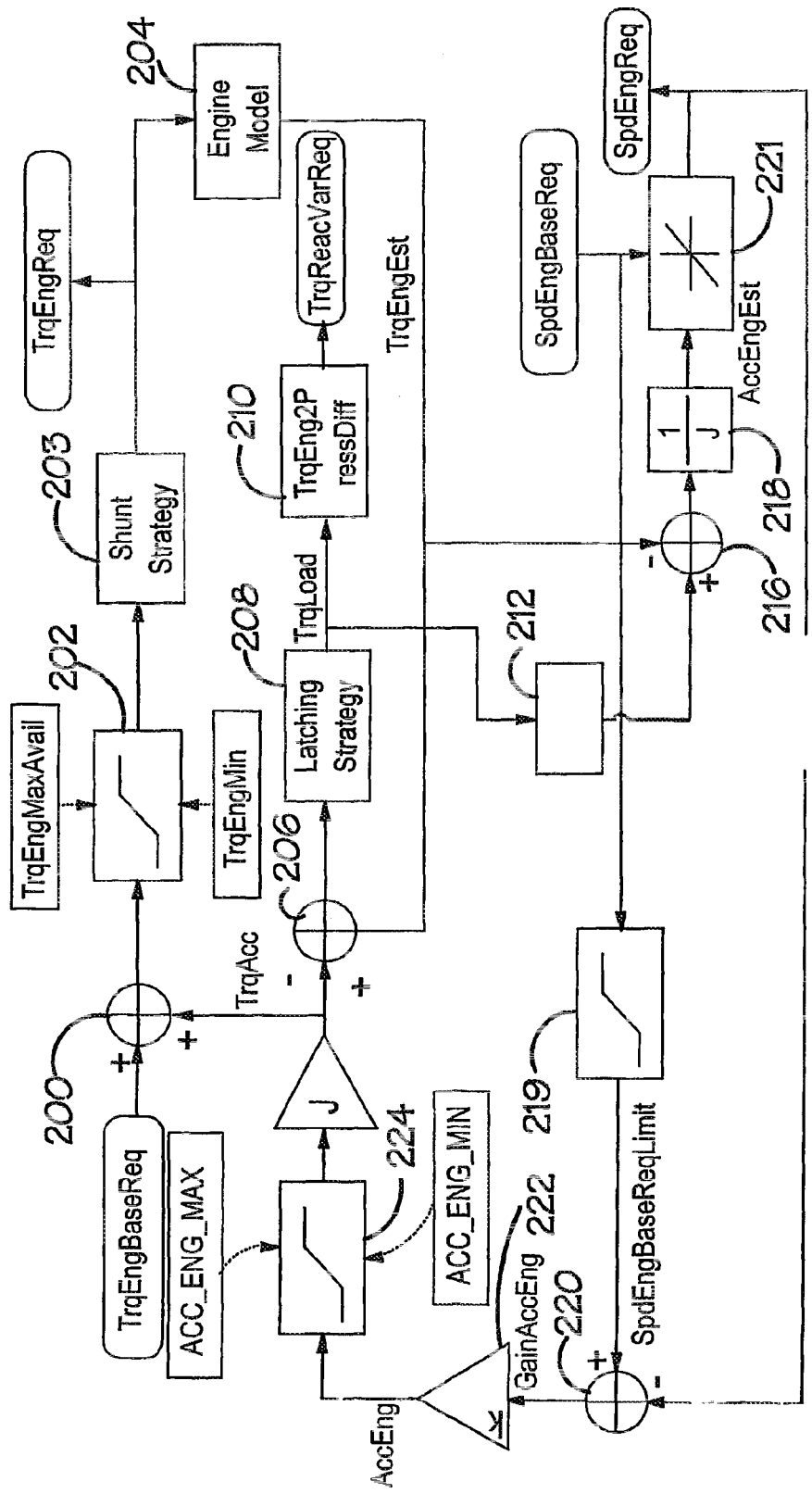
FIG. 6 is a flow diagram representing a "feed forward" part of a powertrain control strategy embodying the present invention.

The feed forward part of the control process will now be described in more detail with reference to FIG. 6, wherein the target engine torque is represented by the input variable TrqEngBaseReq and the target engine speed by the input variable SpdEngBaseReq.

Looking firstly at the top left of the diagram, the base target engine torque TrgEngBaseReq is added, at 200, to a torque TrqAcc calculated to provide a target engine acceleration. The determination of TrqAcc will be considered below. Of course the torque available from the engine is finite and a limiter 202 ensures that if the input to the limiter is a torque greater, or indeed more negative, than the engine can supply then it is modified to fall within the available torque range. The output from the limiter 202 goes to a shunt strategy 203 which slightly modifies the profile of changes to the engine torque, preventing very abrupt engine torque changes (as might occur e.g. when the accelerator control is rapidly depressed by the driver) which could otherwise produce undesirable shocks in the powertrain. The shunt strategy takes the form of an integrator (with respect to time) which is normally saturated so that its output follows its input. In the event of abrupt input changes, however, the integrator's output takes a finite time to "catch up" to the input so that the output of the strategy changes more slowly than its input. The resulting required torque value, TrqEngReq, is used in controlling the engine torque demand applied to the engine, as will be explained below with reference to FIG. 13. Hence, where possible, the engine is set to provide an engine torque corresponding to the sum of the base target engine torque, TrqEngBaseReq, and the torque TrqAcc necessary to accel-erate the engine toward the target engine speed (subject to an adjustment based upon feedback of engine speed, as will be explained below).

As noted above, the engine's response to the engine torque controller is not instantaneous. Even neglecting the effects of engine inertia, the torque generated by the engine lags somewhat behind throttle adjustments, as is well known to the skilled person. Such a time lag is potentially problematic in a torque-controlled transmission where even a brief mismatch between engine torque and variator reaction torque (and correspondingly in the loading torque applied by the transmission to the engine) can lead to a dramatic deviation of engine speed, as explained above. To avoid such problems the illustrated control system incorporates an engine model 204 which, based on the torque requirement input to the engine controller and on a model of the engine behavior, outputs an estimate TrqEngEst of the instantaneous torque created by the engine, allowing for the time lag in the engine's response to its torque controller.

At 206 the torque TrqAcc necessary to accelerate the inertia $J_e$ referred to the engine and transmission is subtracted from the instantaneous engine torque TrqEngEst to give the loading torque to be applied to the engine by the transmission, from which the reaction torque required of the variator is then obtained. However the reaction torque is modified by means of a latching strategy 208 in order to prevent unwanted variations in wheel torque under certain conditions. The latching strategy serves to limit deviation of wheel torque from the level demanded by the driver. The output from the latching strategy represents the engine loading torque to be provided by virtue of the variator and this is converted at 210 to a pressure difference for application to the variator (the variator's primary control signal) which is passed, as an output variable TrqReacVarReq, to logic controlling the fluid pressures applied to the variator itself, to be described below with reference to FIG. 13.

The control system as so far described provides values for use in controlling both the engine torque and the transmission hydraulics. Based on these two values the consequent changes in engine speed are estimated. In doing so it is necessary to take account not only of the time lag in the engine's response, (modeled at 204 as mentioned above) but also of time lags in the response of the variator to its control input. As already explained the control signal to the variator is provided in the form of two oil pressures controlled by valves in the hydraulics associated with the variator. Changes in the valve settings take a finite time to produce an effect, this delay being allowed for at 212. Compliance in the hydraulics produces a contribution to the lag, also modeled at 212 to product an output which is an estimate of the instantaneous transmission reaction torque.

The torque available to overcome powertrain inertia and so accelerate the engine is the difference between the instantaneous loading torque applied to the engine (referred to in the discussion of FIG. 2 as $T_{in}$, and which could equivalently be referred to as the torque input to the transmission) and the instantaneous engine torque (referred to above as $T_e$). In FIG. 6 a comparator 216 takes away the estimated instantaneous engine torque, output from the engine model 204, from the estimated instantaneous loading torque. Dividing the result by the inertia $J_e$ referred to the engine at 218 gives an estimate of engine acceleration and integrating at 221 provides a prediction of the engine speed. In practice, since the inertia $J_e$ is not constant, this calculation is somewhat more complicated, as will be explained below. The integrator also receives the base target engine speed SpdEngBaseReq, which serves to saturate the integrator, thus preventing the predicted engine speed from overshooting the target engine speed.

It has yet to be explained how the target engine acceleration is determined. Note that the base target engine speed SpdEngBaseReq is supplied, via a limiter 219, to subtraction block 220 which takes the predicted engine speed SpdEngReq away from the limited target engine speed SpdEngBaseReqLimit, giving a prediction of the difference between the actual engine speed and the target engine speed. The system controls the engine acceleration as a function of this difference. In the illustrated example, the target engine acceleration is chosen to be proportional to the difference SpdEngBaseReqLimit minus SpdEngReq, a constant of proportionality GainAccEng being introduced at 222. This process provides a suitable profile to the engine acceleration, which is large when the engines speed is a long way from the target value and falls as the engine speed approaches the target value. Clearly, however, a different function could be chosen for setting the target engine acceleration AccEng.

A further limiter 224 ensures that the desired engine acceleration does not exceed acceptable limits. It is then necessary to calculate TrqAcc, the excess torque required to achieve the engine acceleration AccEng. In principle, and neglecting energy losses, TrqAcc is equal to AccEng multiplied by the driveline inertia $J_e$ referred to the engine. However $J_e$ is in a practical transmission not constant as noted above. An explanation will now be provided of how the relationship between TrqAcc and engine acceleration can be calculated.

Figure 7:
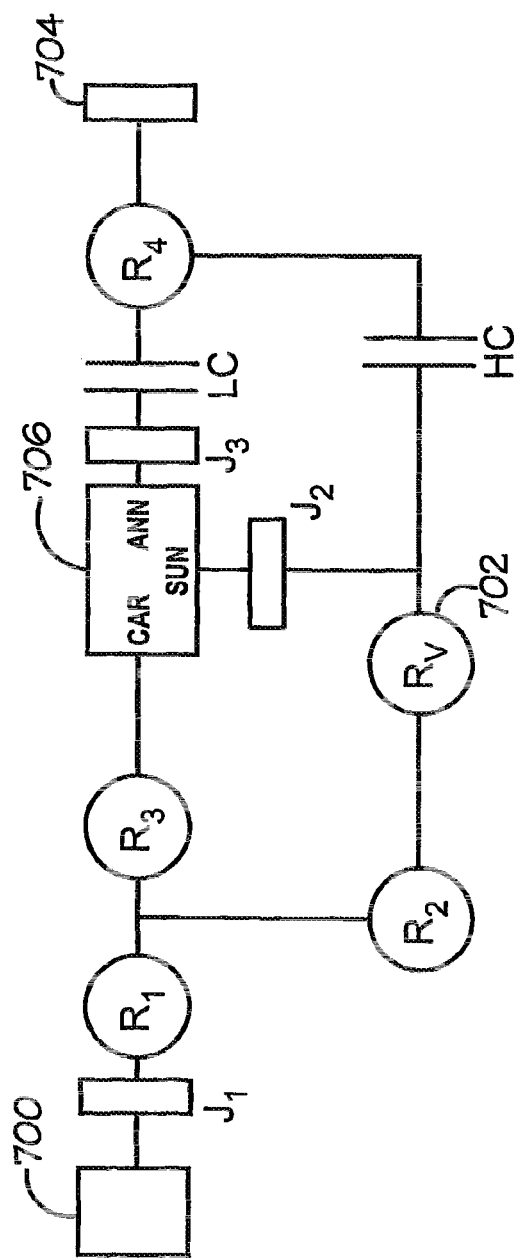
FIG. 7 is a highly schematic representation of a transmission operable in accordance with the present invention.

This relationship arises from the particular form of the gearing used to couple the variator to the engine and wheels and FIG. 7 provides a schematic illustration of a suitable arrangement. This is of the dual regime, power recirculatory type already known in the art e.g. from Torotrak (Development) Limited's earlier patents including EP933284. In FIG. 7 the engine is indicated at 700, the variator at 702 and an output of the transsmission to driven vehicle wheels at 704. An epicyclic "shunt" gearing arrangement is indicated at 706 and boxes $R_1$-$R_4$ represent gear ratios at various points in the transmission.

The epicyclic comprises, in the usual manner, a planet carrier CAR, a sum gear SUN and an annular outer gear ANN. The planet carrier CAR is driven from the engine via gearing $R_1$, $R_3$. The sun gear is driven via $R_1$, $R_2$ and the variator 702 itself. The instantaneous variator ratio will be referred to as $R_v$.

To engage low regime (in which the available range of variator drive ratio maps onto a low range of transmission ratios) a low regime clutch LC is engaged, coupling the annular gear ANN to the output 704 via gearing with a ratio $R_4$. In low regime power is recirculated through the variator in a manner familiar to the skilled person, To engage high regime (in which the available range of Variator drive ratio maps onto a higher range of transmission ratios) a high regime clutch HC is engaged, forming a drive path from the variator output through clutch HC to gearing $R_4$ and so to the transmission output.

Inertias of the engine and transmission are represented by $J_1$, which includes the inertia of the engine; $J_2$, an inertia coupled to the sun gear SUN; and $J_3$, an inertia coupled to the annular gear ANN. Rotational speeds of the three inertias are referred to respectively as $\omega_1$, $\omega_2$ and $\omega_3$. $\omega_1$ is therefore engine speed in this diagram.

The relationship between TrqAcc and engine acceleration ($d\omega_1/dt$) is obtained using conservation of energy. An input power $\omega_1 \times$TrqAcc goes to change kinetic energy of the transmission and changes in speed result.

Looking firstly at the low regime case, inertia $J_3$ is coupled to the vehicle wheels and is subject to the transmission output torque, which has of course been treated separately from TrqAcc. Hence it is necessary only to consider kinetic energies $Q_1$ and $Q_2$ of $J_1$ and $J_2$.

$$Q_1 = \tfrac{1}{2} J_1 \omega_1^2$$

and $$Q_2 = \tfrac{1}{2} J_2 \omega_2^2$$

and total kinetic energy $$Q_{TOT} = \tfrac{1}{2}(J_1 \omega_1^2 + J_2 \omega_2^2) \qquad \text{(Eq 1)}$$

and since the control system monitors variator ratio $R_v$, $\omega_2$ can be stated in terms of $\omega_1$.

$$\omega_2 = R_1 R_2 R_v \omega_1 \qquad \text{(Eq2)}$$

Substituting equation 1 into equation 2:

$$Q_{TOT} = (J_1 + J_2(R_1 R_2 R_v)^2)\omega_1^2$$

and the rate of change of this kinetic energy is equal to the input power so:

$$dQ_{TOT}/dt = TrqAcc \times_1 = (J_1 + J_2(R_1 R_2 R_v)^2)\omega_1 d\omega_1/dt + (2 J_2 R_1^2 R_2^2 dR_v/dt)\omega_1^2/2$$

Hence it is possible to determine the excess torque TrqAcc required to accelerate the engine, this value being added to the target engine Torque TrgEngBaseReq at 200, as already explained above.

The process described with reference to FIG. 6 may be described as a "feed forward" strategy. It provides values for two important control variables—TrqEngReq and TrqReacVarReq, the torque demand to be used in controlling the engine and the reaction torque demand to be used in controlling the transmission. These are obtained upon the basis of predictions of the system's responses (hence the term "feed forward"). However these values are not supplied directly to the devices controlling the engine and transmission. Instead they are modified based on feedback relating to engine speed (step 7 in the summary given above). The feedback strategy utilizes the predicted engine speed SpdEngReq, which is a third important output from the feed forward strategy.

Figure 8:
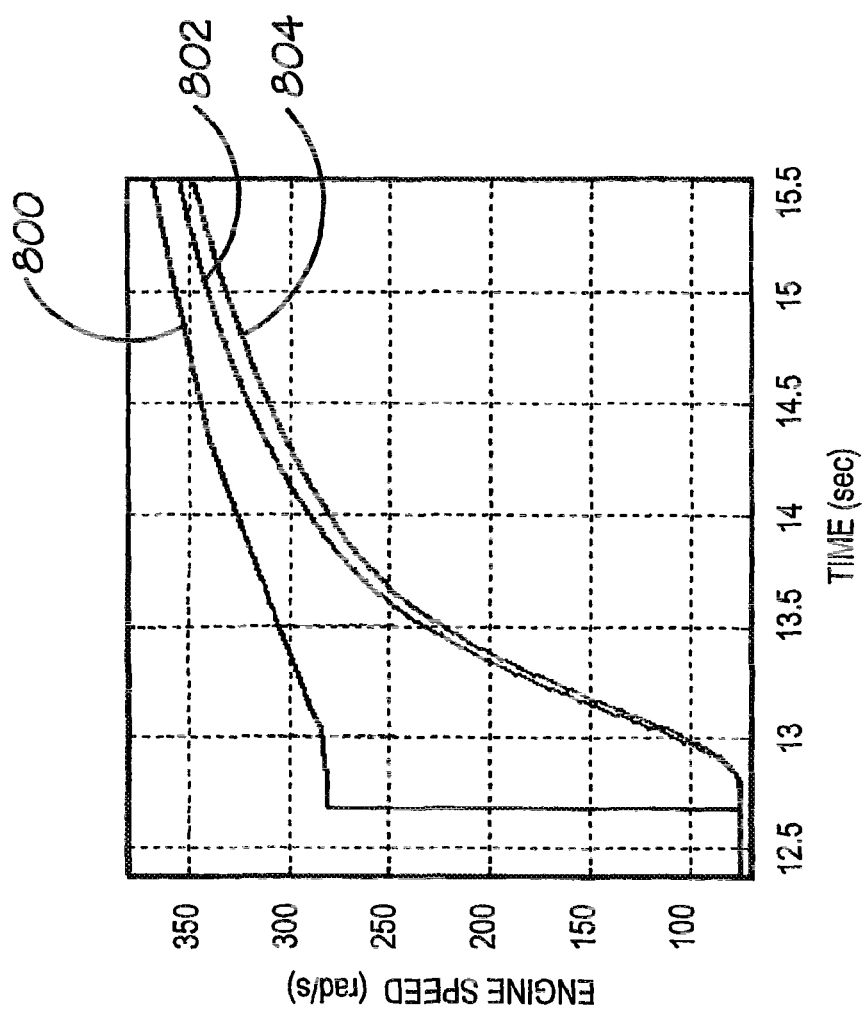
FIG. 8 is a graph of engine speed variation and related variables over time in the operation of a transmission according to the present invention.

To appreciate how the feed forward and feedback strategies cooperate, refer to FIG. 8 which is a graph of engine speed (in radians per second, on the vertical axis) against time (in seconds, on the horizontal axis). Line 800 represents the base target engine speed SpdEngBaseReq derived from interpretation of the driver's demand. Between 12.5 and 13 seconds the driver's accelerator control is abruptly depressed and the base target engine speed increases instantaneously from below 100 to over 250 radians per second, in line with the increased requirement for engine power. Line 802 represents the predicted engine speed SpdEngReq from the feed forward strategy. Of course this lags behind the base target engine speed since engine acceleration is physically limited. It also shows a controlled profile. Line 804 represents actual engine speed and is seen to deviate somewhat from the prediction. What the feedback strategy does is to adjust the demands applied to the engine and transmission such as to reduce the deviation of actual engine speed 804 from the prediction 802 provided by the feed forward strategy.

In the feed forward part of the control strategy it is the engine torque that is preferentially adjusted to create the excess torque needed to accelerate the engine or of course the torque deficit needed to decelerate the engine). Adjustments to the transmission (which result in deviation of wheel torque from the value required by the driver) are made only if the engine is unable to provide the necessary torque. In the feedback part of the strategy, however, adjustments are preferentially made to the transmission, to vary the loading torque applied to the engine. The engine torque is adjusted by the feedback strategy only when the "control effort" required by this part of the strategy would, if implemented by adjustment only to the transmission, result in an unacceptable deviation of the wheel torque from that requested by the driver. Because adjustments to the loading torque applied by the transmission can be made relatively quickly, the feedback strategy is able to react rapidly to deviations of engine speed from the desired value.

Figure 9:
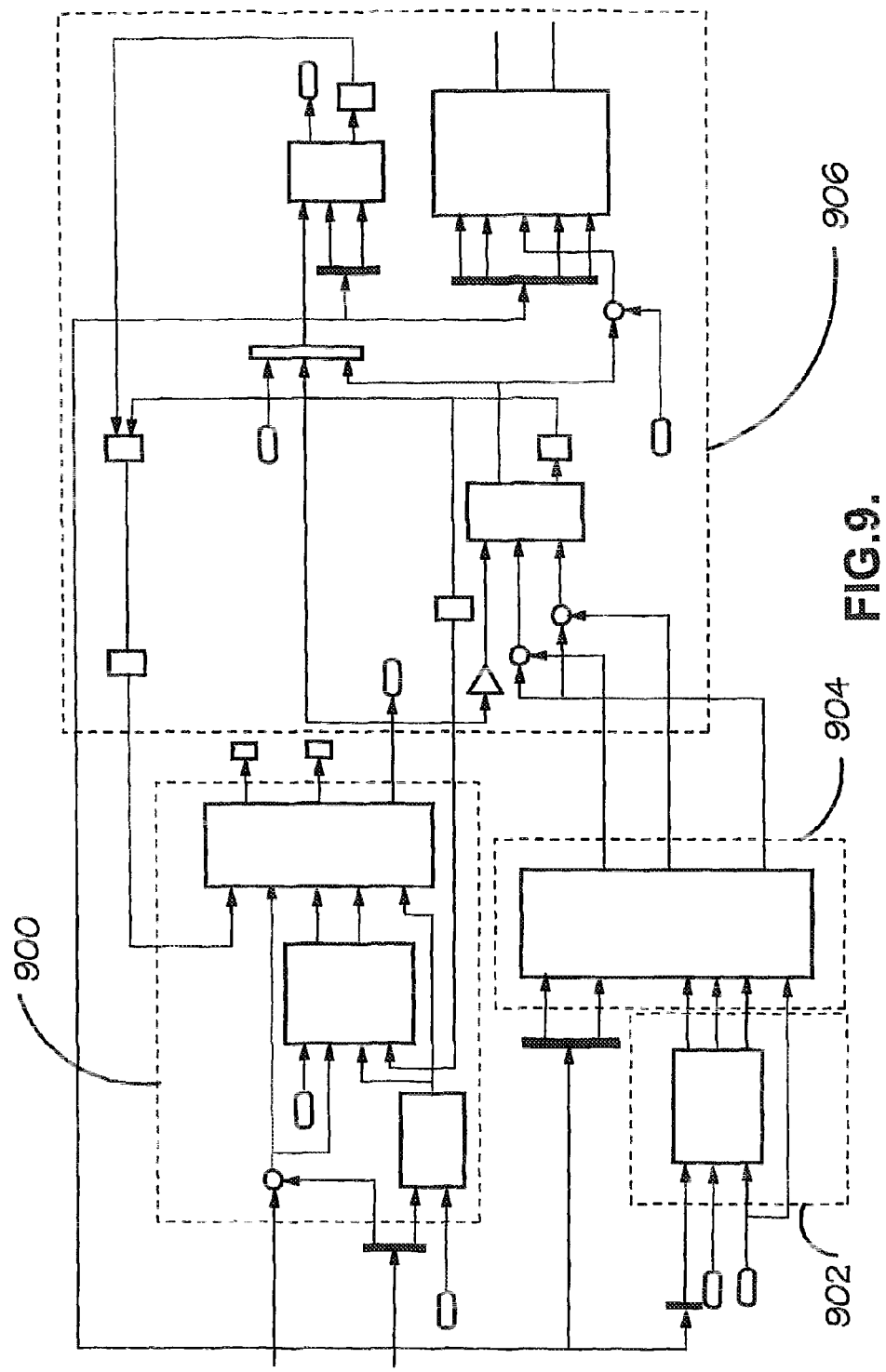
FIG. 9 is a flow diagram providing an overview of a "feedback" part of the powertrain control strategy embodying the present invention.

FIG. 9 provides an overview of the feedback strategy which serves to modify the required variator reaction torque TrqReacVarReq, and where necessary also the required engine torque TrqEngReq, such as to minimize deviations of the engine speed SpdEng from the predicted value SpdEngReq. Most variable labels etc. are omitted from FIG. 9 due to space constraints and instead the four main parts of this drawing are shown enlarged in FIGS. 10, 11, 12 and 13.

Figure 10:
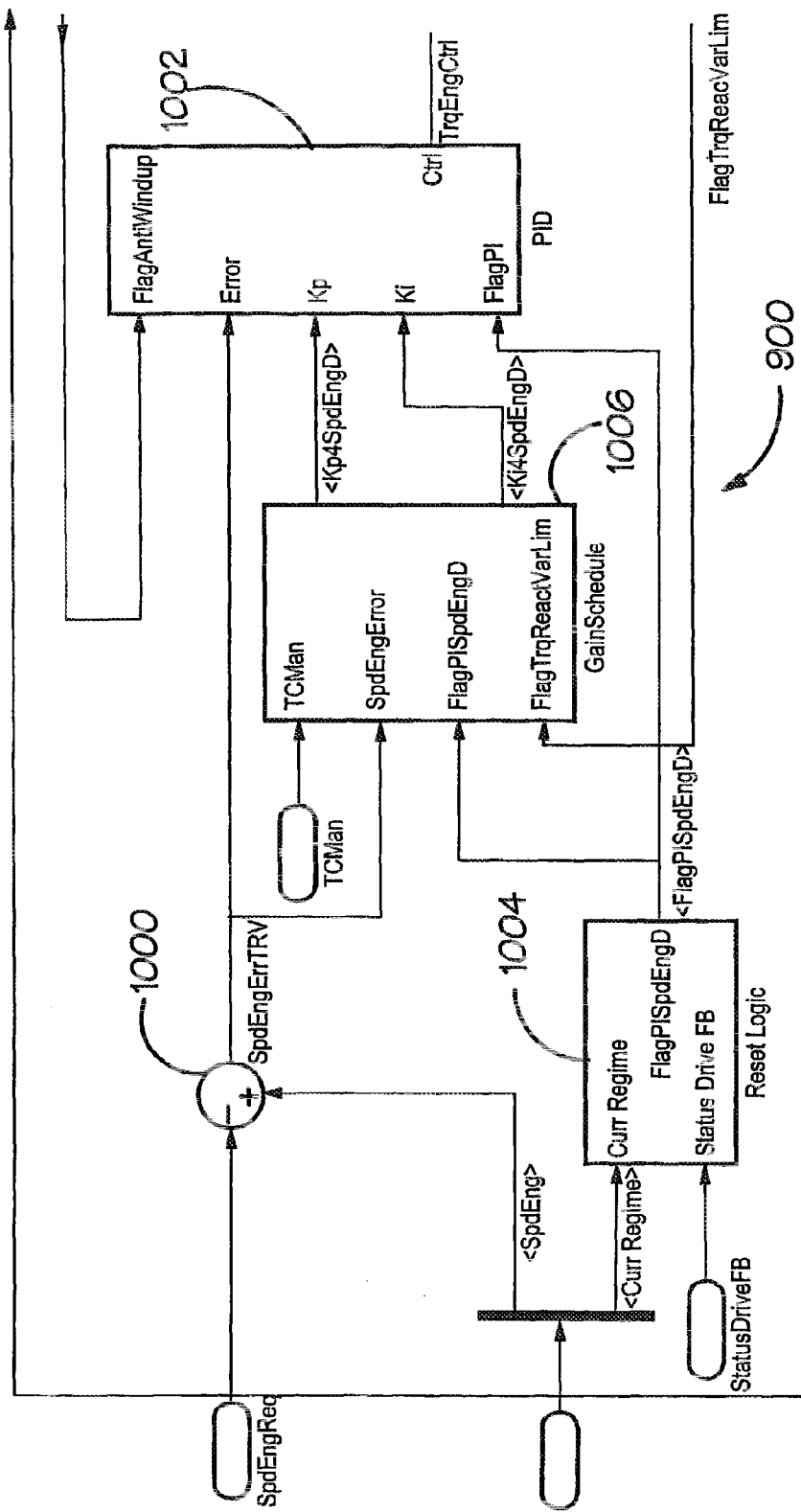
FIGS. 10-13 are flow diagrams showing in greater detail respective parts of FIG. 9.

Elements of the feedback strategy shown in dotted loop 900 of FIG. 9 and inn more detail in FIG. 10 serve to generate a "control effort" TrqEngCtrl which represents the shift in the dynamic torque balance between engine torque and loading torque required by the feedback strategy to correct deviation of the engine speed SpdEng from the predicted value SpdEngReq. This part of the strategy receives both SpdEngReq and also data representing the current transmission operating point—the current engine speed SpdEng and the current transmission regime CurrRegime. The control effort is established on the basis of the engine speed error SpdEngErrTRV which is established at 1000 by subtracting SpdEng from SpdEngReq. SpdEngErrTRV is applied to a proportional integral differential controller (PID) 1002 of a conventional type. Reset logic 1004 receives both the current transmission regime CurrRegime and the status StatusDriveFB of the "drive control" (by which the driver selects forward, reverse, neutral etc.) and, where appropriate, sets a flag FlagPLSpdEngDr to reset the PID controller 1002. Thus for example the PID controller is reset when the driver selects "park" or "neutral". The PID is also reset as the transmission moves from one regime to the other. This is because regime change involves a finite period in which both low and high regimes are engaged, which effectively locks the variator at the synchronous ratio. In this condition the variator is not able to respond to pressure input and engine speed error cannot be corrected by the transmission since, at fixed synchronous ratio, engine speed is simply proportional to vehicle speed. The PID controlled may thus be "wound up" in this condition, hence the need to reset it.

The response of the PID controller 1002 to the engine speed error is dependent upon two values Kp and Ki (proportional and integral coefficients) in known manner. Note that in this embodiment there is no differential coefficient input and in fact the differential of the engine speed error is not used by the PID controller. Using a differential term proves unnecessary and is potentially problematic because of noise. The coefficients Kp and Ki are determined by a gain schedule 1006 which receives a flag FlagTrqReacVarLim which as will become more clear below, indicates one of two possible conditions. In the first condition the control effort can be implemented by adjustment to the transmission alone and the PID controller 1002 controls this adjustment. In the second condition the transmission adjustment is saturated—that is, the maximum acceptable adjustment to the transmission is made and is insufficient to implement the control effort required to correct engine speed error. In this condition adjustment is additionally made to the engine torque and the PID controller is used to determine the value of this engine torque adjustment. The gain required of the HD controller 1002 is different in the two conditions due to the different characteristics of the engine and transmission, and the actuators used to control them, and is determined by die gain schedule 1006 which sets the coefficients Kp and Ki on the basis of:

i. the flag FlagTrqReacVarLim;

ii. a time constant TcMan of the inlet manifold, which is relevant in determining the time lag affecting changes to engine torque;

iii. the engine speed error SpdEngErrTRV itself; and iv. the rest flag FlagPLSpdEngD.

The values of the coefficients may be found as mathematical functions of the inputs to the gain schedule or, as in the present embodiment, from look up tables.

Based upon the engine speed error and in the manner determined by the coefficients Kp and Ki, the PID controller determines the control effort TrqEngCtrl. This quantity is a torque and represents the shift in the dynamic torque balance between engine torque and loading torque required by the feedback strategy to correct for engine speed error.

It will now be explained how the control effort is implemented—i.e. how the feedback strategy determines what modification of the transmission and engine torque settings to use to provide the required, shift in the dynamic torque balance.

The first step is to establish whether the control effort can be implemented solely by adjustment of the transmission, without adjustment of the engine torque. Recall that by adjusting the reaction torque created by the variator, the loading torque applied to the engine is adjusted, but that this creates a corresponding deviation in the wheel torque, which may be perceptible—and unwelcome—to the driver. Also as the transmission drive ratio approaches geared neutral, the ratio of wheel torque to loading torque increases so that a given adjustment to loading torque creates an increased wheel torque deviation. Hence at low ratios it is not appropriate to rely upon the transmission alone to control engine speed deviation, since to do so may result in inappropriate wheel torque being created. The approach to this problem is in three steps:

i. determine a range of wheel torque (above and below the desired wheel torque TrqWhlDriverReq set on the basis of driver demand) which is acceptable;

ii. determine the range of engine loading torque which corresponds to the wheel torque range; and iii. then establish whether the required shift in the dynamic balance at the engine can be provided by adjustment of the transmission alone, without departing from the engine loading torque range (and hence from the wheel torque range).

Figure 11:
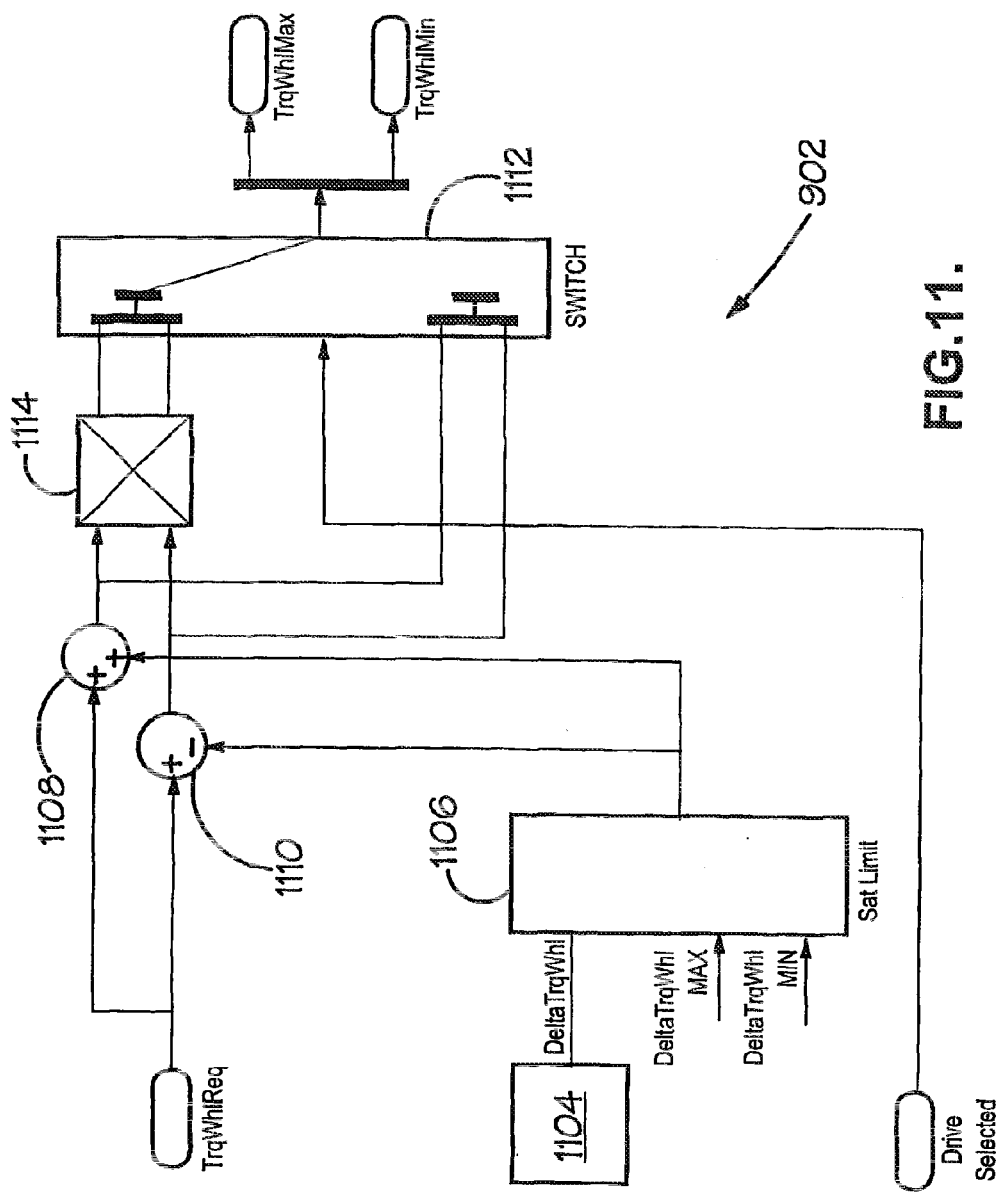
Figure 12:
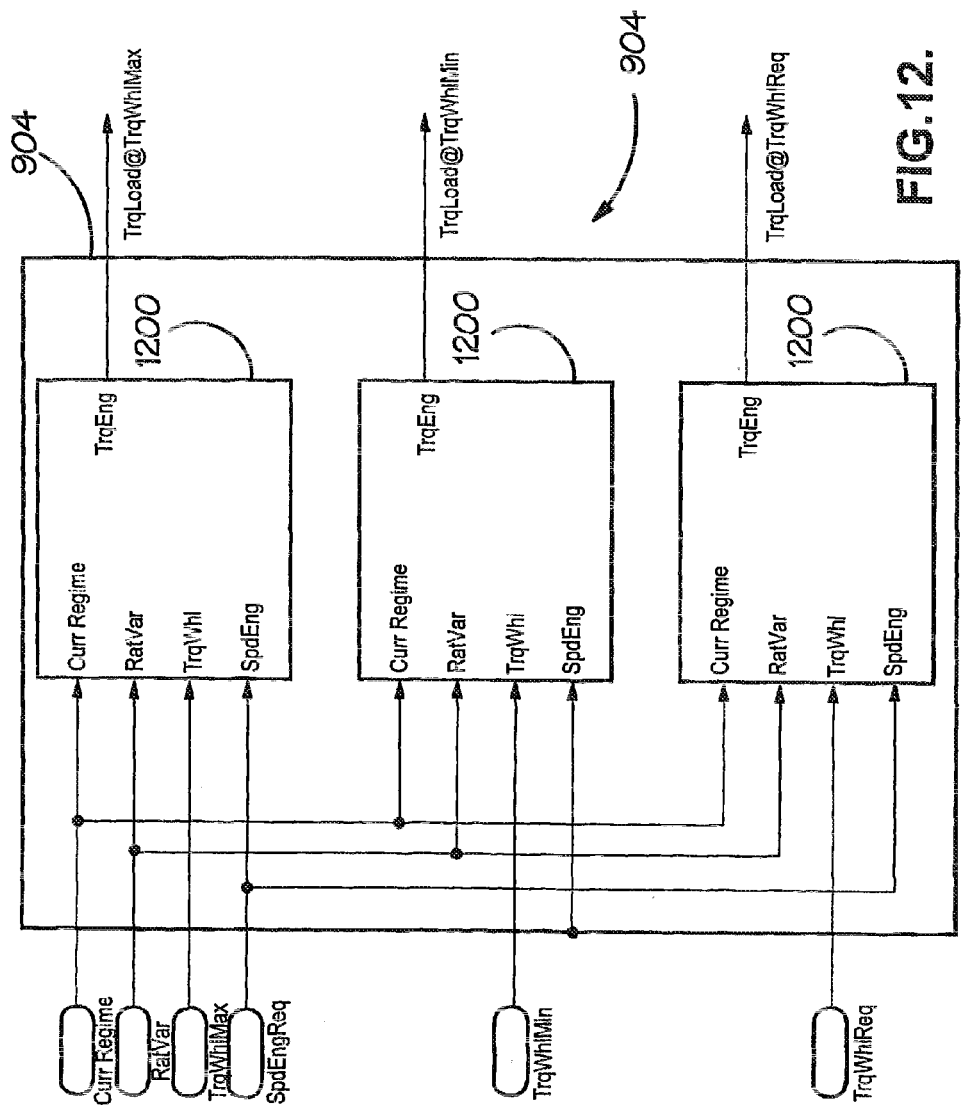

The first of these steps is represented in dotted loop 902 of FIG. 9, and in more detail in FIG. 11. The level DeltaTrqWhl of deviation of wheel torque from the desired value TrqWhlReq which can be accepted can be calculated in several different ways. Which is most desirable is partly a matter of driver perception. In FIG. 11 the calculation of this value is carried out at 1104. Most simply, DeltaTrqWhl may be chosen to be constant. This has been demonstrated to provide a working system. Alternatively DeltaTrqWhl may be calculated as a function of accelerator control position and/or vehicle speed and/or target wheel torque. Thus for example the wheel torque may be more closely constrained to follow driver demand when the wheel torque demand indicated by the driver is low, or the vehicle speed is low, or the target wheel torque is low. When the driver calls for large wheel torque, a larger divergence between demanded and actual values is tolerable.

The output DeltaTrqWhl of the block 1104 is led to a limiter 1106 which ensures that the wheel torque value does not exceed limits DELTATRQWHL$_{MAX}$ and DELTATRQWHL$_{MIN}$. Then at adder 1108 and subtractor 1110 it is respectively added to and taken away from the desired wheel torque TrqWhlReq to provide maximum and minimum acceptable values of total wheel torque. The proper order of these values is dependent upon whether the vehicle controls are set for forward or reverse since the sign of TrqWhlReq is negative in reverse and positive in forward operation. This aspect is taken care of by a switch 1112 which, based upon a flag DriveSelected selects either direct outputs from the adder and subtractor 1108, 1110 or outputs routed through a reverser 1114 and in its turn outputs variables TrqWhlMax and TrqWhlMin representing the acceptable wheel torque range.

Because wheel torque and engine loading torque are related, the acceptable wheel torque range corresponds to a certain range of engine loading torque. The present system uses a mathematical model of the transmission to determine the engine loading torque range corresponding to the acceptable wheel torque range TrqWhlMin to TrqWhlMax (step (ii) from the summary above). The relevant functional block is indicated at 904 and more detail is provided in FIG. 12.

The current engine speed SpdEng and vehicle speed SpdVeh are input to block 904 and together allow current transmission ratio to be determined. If the transmission were 100% efficient then simply dividing the transmission ratio by wheel torque would give the engine loading torque. In a real transmission however energy losses take place and the wheel torque/loading torque relationship is more complex. Using the above inputs and also the current transmission regime Curr Regime, which has an influence on transmission efficiency, physical model 1200 is used to convert the maximum, minimum and target wheel torques TrqWhlMax, TrqWhlMin and TrqWhlReq respectively to maximum, minimum and required engine loading torques TrqLoad@TrqWhlMax, TrqLoad@TrqWhlMin and TrqLoad@TrqWhlReq. The maximum and minimum values represent the range of loading torques which can be applied by the transmission to the engine without causing an unacceptable deviation of wheel torque from the driver's demand.

Figure 13:
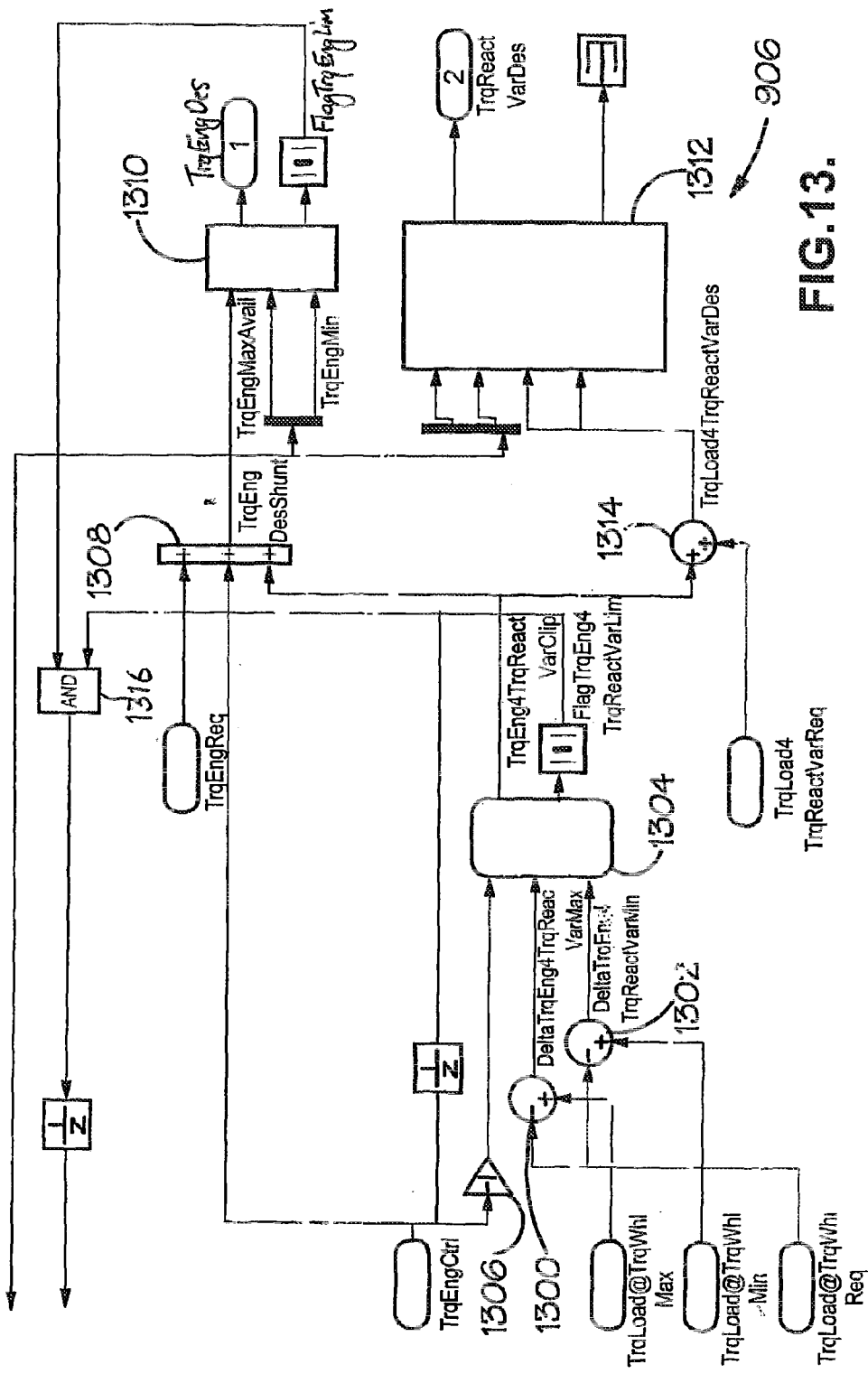

The maximum, minimum and required engine loading torques, along with the control effort TrqEngCtrl, are passed to the part of the strategy contained in dotted loop 906 at FIG. 9 and represented to a larger scale in FIG. 13, which serves to determine the adjustments to engine and transmission settings required to implement the control effort. At 1300 and 1302 the required engine loading torque TrqLoad@TrqWhlReq (corresponding to the required wheel torque) is taken away from the maximum acceptable engine loading torque TrqLoad@TrqWhlMax and the minimum acceptable engine loading torque TrqLoad@TrqWhlMin to yield respectively the maximum and minimum adjustments to the dynamic balance between engine torque and loading torque which can be created by transmission adjustment without departing from the acceptable wheel torque range. These are given the respective variable names DeltaTrqEng4TrqReacVarMax and DeltaTrqEng4TrqReacVarMin in the diagram and are input to a limiter 1304 which also receives a value of the control effort TrqEngCtrl which has been inverted (i.e. multiplied by minus one at 1306. The limiter determines whether the control effort falls between DeltaTrqEng4ReacVarMax and DeltaTrqEng4TrqReacVarMin—i.e whether the required control effort can be implemented by transmission adjustment alone without departing from the acceptable wheel torque range. If it can—that is, if the control effort TrqEngCtrl falls within the relevant range—then the limiter's output TrqEng4TrqReacVarClip is set to be equal to the inverted value of the control effort TrqEngCtrl. If the control effort falls outside the range then the transmission adjustment is saturated and the limiter's output TrqEng4TrqReacVarClip is clipped to be equal to either the maximum or minimum acceptable adjustment to the loading torque—i.e. either to DeltaTrqEng4TrqReacVarMax or to DeltaTrqEng4TrqReacVarMin. A flag FlagTrqEng4TrqReacVarMin is also output by the limiter to indicate whether the transmission adjustment is saturated. Its function will be explained below.

An adder 1308 and an engine torque limiter 1310 together determine the torque request TrqEngDes to be applied to the engine. The adder receives the required engine torque TrqEngReq established by the feed forward strategy and adds this to (a) the control effort TrqEngCtrl and (b) the output TrqEng4TrqReacVarClip from the limiter 1304. Recall that while the transmission adjustment is not saturated (i.e the control effort can be implemented by transmission adjustment alone) TrqEngCtrl is equal to TrqEng4TrqReacVarClip multiplied by minus one. Hence under this circumstance TrqEngCtrl and TrqEng4TrqReacVarClip cancel each other out and the output TrgEngDesShunt from the adder 1308 is equal to the required engine torque TrqEngReq. That is, the feedback strategy does not modify the required engine torque. However if the transmission adjustment is saturated then the sum of TrqEngCtrl and TrqEng4TrqReacVarClip is non zero and is added to the required engine torque TrqEngReq. The effect is that whatever part of the control effort TrqEngCtrl cannot be implemented by adjustment of the transmission is instead added to the torque to be demanded of the engine.

Of course there are physical limitations upon the maximum and minimum torque which the engine can provide. To take account of these the engine torque demand limiter 1310 clips TrqEngDesShunt if it falls outside the available range TrqEngMin to TrqEngMaxAvail and the result is the final engine torque demand TrqEngDes, which is passed to the engine torque controller. FlagTrqEngLim indicates whether the limiter is active A physical model 1312 of the transmission is used in establishing the final control value TrqReacVarDes to be used in controlling the transmission. Refer once more to FIG. 6 and recall that the feed forward strategy provides a value TrqLoad (the output from latching strategy 208) for the engine loading torque to be applied by the variator. This is added at 1314 to the clipped control effort TrqEng4TrqReacVarClip, the resulting value TrqLoad4TrqReacVarDes being input to the physical model 1312. This model converts engine loading torque into the variator reaction torque demand. It does so on the basis of current transmission regime and variator ratio. The model's output TrqReacVarDes is used by software controlling the transmission to set the demands for pressures applied to the variator pistons 30 (FIG. 1).

There are circumstances under which the feedback adjustments to both engine and transmission are saturated, when the desired correction to engine speed cannot physically be provided without an excessive deviation in wheel torque from the value required by the driver. Under these conditions the magnitude of the output from the PID controller 1002 could be expected to increase (or "wind up") over time due to the integral Term in an undesirable manner. To prevent this an AND junction 1316 receives both FlagTrqEng4TrqReacVarLim and Flag TrqEngLim, the flags indicating whether the transmission and engine adjustments are at their limits. The AND junction's output forms a flag FlagAntiWindup which is input to the PID controller 1002 to inhibit wind up.

The aforegoing embodiment serves as an example only and of course the practical implementation of the claimed invention may take other forms. For example, in place of the P.I.D. controller some other closed loop controller based on advanced control theory such as a state space or "H infinity" or sliding mode controller could be used.

What is claimed is:

1. A method of controlling engine speed error in a motor vehicle powertrain comprising an engine which drives at least one vehicle wheel through a transmission which provides a continuously variable ratio, the transmission being constructed and arranged to exert upon the engine a controlled loading torque and to permit the transmission ratio to vary in accordance with resultant changes in engine speed, so that engine acceleration results from application of a net torque, which is the sum of the loading torque and an engine torque created by the engine, to the inertias referred to the engine, the method comprising, in a feedback loop:
    determining the engine speed error as a difference in a current engine speed and a predicted engine speed,
    supplying the engine speed error to a closed loop controller which establishes a control effort, which is a correction to the net torque required to reduce the engine speed error,
    determining when the control effort can be achieved by adjustment of a loading torque without a deviation beyond a threshold amount of torque at the driven wheel requested from a driver, and adjusting the loading torque to achieve the control effort,
    when adjustment of the loading torque alone results in the deviation beyond the threshold amount of torque at the driven wheel requested from the driver, establishing an allocation of the control effort between (i) adjustment of the engine torque and (ii) adjustment of the loading torque to achieve the control effort, and
    adjusting one or more of the engine torque and the loading torque based on the allocation of the engine toque and the loading toque to achieve the control effort.

2. A method as claimed in claim 1 wherein the control effort is preferentially allocated to the loading torque adjustment.

3. A method as claimed in claim 1 wherein the implementation of the control effort involves adjustment of the engine torque only when the control effort exceeds a threshold.

4. A method as claimed in claim 1 further comprising limiting the adjustment to the loading torque on the basis of the deviation in torque at the driven wheel ("wheel torque") which it creates.

5. A method as claimed in claim 4 wherein a maximum acceptable deviation of wheel torque is set as a function of any one or more of: driver's accelerator control position, vehicle speed and target wheel torque.

6. A method as claimed in claim 4 comprising the further step of calculating a maximum loading torque adjustment from a maximum acceptable wheel torque deviation.

7. A method as claimed in claim 1, wherein the adjustment of the engine torque is established by subtracting the loading torque adjustment from the control effort.

8. A method as claimed in claim 1, wherein engine speed error is established by comparison of current engine speed with a predicted engine speed established by calculating engine acceleration on the basis of engine and transmission settings and integrating engine acceleration over time.

9. A method of engine speed control wherein base requirements for engine and transmission settings are established by a feed forward method and are adjusted by a feedback method comprising a method of controlling engine speed error in a motor vehicle powertrain comprising an engine which drives at least one vehicle wheel through a transmission which provides a continuously variable ratio, the transmission being constructed and arranged to exert upon the engine a controlled loading torque and to permit the transmission ratio to vary in accordance with resultant changes in engine speed, so that engine acceleration results from application of a net torque, which is the sum of the loading torque and an engine torque created by the engine, to the inertias referred to the engine, the method comprising, in a feedback loop:
    determining the engine speed error as a difference in a current engine speed and a predicted engine speed,
    supplying the engine speed error to a closed loop controller which establishes a control effort, which is a correction to the net torque required to reduce the engine speed error,
    determining when the control effort can be achieved by adjustment of a loading torque without a deviation beyond a threshold amount of torque at the driven wheel requested from a driver, and adjusting the loading torque to achieve the control effort,
    when adjustment of the loading torque alone results in the deviation beyond the threshold amount of torque at the driven wheel requested from the driver, establishing an allocation of the control effort between (i) adjustment of the engine torque and (ii) adjustment of the loading torque to achieve the control effort, and
    adjusting one or more of the engine torque and the loading torque based on the allocation of the engine toque and the loading toque to achieve the control effort.

10. A method as claimed in claim 9 wherein the feed forward method preferentially controls engine speed using the engine and the feedback method preferentially controls engine speed error using the transmission.

11. A method as claimed in claim 9 wherein the feed forward method preferentially selects base transmission settings to provide a wheel torque demanded by the driver and selects base engine settings to achieve a desired engine speed.

* * * * *